United States Patent [19]
Trocquemé
[11] 3,828,262
[45] Aug. 6, 1974

[54] DEVICE FOR THE AUTOMATIC ADJUSTMENT OF THE AMPLITUDE OF SIGNALS

[75] Inventor: François Jean Trocquemé, Landorthe, France
[73] Assignee: Enterprise De Recherches D'Activites Petrolieres Elf, Paris, France

[22] Filed: Apr. 16, 1973
[21] Appl. No.: 351,560

[30] Foreign Application Priority Data
Apr. 20, 1972 France .............................. 72.14006

[52] U.S. Cl. ............. 328/175, 307/235 R, 307/264, 328/146, 330/86
[51] Int. Cl. ............................................. H03k 5/20
[58] Field of Search ........... 307/235, 239, 240, 264; 328/146, 150, 168, 169, 172, 173, 175; 330/29, 86, 144, 145

[56] References Cited
UNITED STATES PATENTS

| | | | |
|---|---|---|---|
| 3,315,223 | 4/1967 | Hibbard et al. | 330/86 X |
| 3,525,948 | 8/1970 | Sherer | 330/86 X |
| 3,539,936 | 11/1970 | McGhee | 330/29 |
| 3,629,720 | 11/1971 | Sedra | 330/86 |
| 3,683,284 | 8/1972 | Mueller | 307/235 R X |

OTHER PUBLICATIONS

Nirschl, "Window Comparator Indicates System Status," EDN/EEE, p. 49–50, 6/15/1971.

Tobey, "Vary Op-amp Gain by 2048:1 in Steps of 2:1," Electronic Design (Pub.), p. 60; 11/22/1970.

Ottesen, "Inverting Function Generation," IBM Tech. Discl. Bull., Vol. 13, No. 11, p. 3,549–3,550; 4/1971.

*Primary Examiner*—Rudolph V. Rolinec
*Assistant Examiner*—L. N. Anagnos
*Attorney, Agent, or Firm*—Lane, Aitken, Dunner & Ziems

[57] ABSTRACT

Automatic adjustment of amplitude is carried out on any predetermined half-wave of a recurrent analog signal by means of a device comprising a variable-gain amplifier, a storage circuit for indicating the amplitude of each output signal of the amplifier, a decision logic circuit which assumes a logical state A if the indicated amplitude does not attain a lower threshold level or a logical state D if the indicated amplitude exceeds an upper threshold level, a bidirectional register and a synchronization and control logic system in which means placed at the output of the amplifier eliminate signals smaller in amplitude than a predetermined value and transmit signals to a counter, the state of which is compared with two series of preindicated numbers by means of a comparator having outputs connected to the storage circuit and the decision logic circuit.

8 Claims, 4 Drawing Figures

DEVICE FOR THE AUTOMATIC ADJUSTMENT OF THE AMPLITUDE OF SIGNALS

This invention relates to an improvement in the device for automatic adjustment of the amplitude of recurrent analog signals.

A device of this type makes it possible in particular and without any need for manual adjustment by the operator to record recurrent analog signals having progressively varying amplitudes, said signals being automatically adjusted so as to take up the maximum dynamic range of the recorder without thereby producing saturation.

In devices of this type which already exist, provision is made for an amplifier to which the signals are applied and the gain of which is capable of varying in steps under the action of switching elements, said switching elements being either open or closed according to the level of the signal with respect to reference threshold levels. In other words, in devices of this type the amplitude of each signal is compared with an upper threshold level and a lower threshold level and if the amplitude of the signal is not comprised between these two levels, action is produced on the variable-gain amplifier in order to correct the amplitude of the following signal as a function of the position of the amplitude of the preceding signal with respect to the two threshold levels. This correction is made on each half-wave of the signal to be adjusted.

In some cases, each signal can be generated as a series of half-waves, only one of which is of practical interest for the measurement which is to be carried out. It can therefore be useful to perform the adjustment of amplitude not on each half-wave of the signal but only on a given and predetermined half-wave of said signal.

This ishe case in particular when it is desired to scan the signal produced by an ultrasonic emitter and detected by a receiver after travelling through a geological formation through which a petroleum bore hole has been drilled. This type of signal is usually produced in acoustic diagraphies for measuring the velocity of propagation of sound. Three types of signals are found in diagraphies and the arrivals of said signals take place successively in time.

A first arrival corresponds to the most rapid mode of propagation, that is to say to the compressional wave (of small amplitude).

A second arrival corresponds to the longest travel of the shear wave or transverse wave.

A third arrival of substantial amplitude corresponds to direct transmission between the emitter and the receiver by the bore-hole mud.

In order to study the signal received, it is useful to isolate the compressional wave or the transverse wave, or more precisely a distinctive half-wave of one of these waves, and to adjust the general amplitude of the complete signal in order that the half-wave selected should be maintained between two threshold levels, namely a minimum level and maximum level.

The precise object of the present invention is to achieve an improvement in the device for the automatic adjustment of the amplitude of recurrent analog signals which makes it possible to carry out the adjustment on a selected half-wave of said signal.

The device for automatic adjustment of amplitude of analog signals essentially comprises:

An amplifier to which said signals are applied and the gain of which is capable of varying in steps under the action of a switching element;

A storage circuit for indicating the amplitude of each output signal of said amplifier with respect to said level;

A decision logic circuit having the design function of producing as a function of the indications collected by the storage circuit a logical state A if the indicated amplitude does not attain the lower threshold level or a logical state D if the indicated amplitude exceeds the upper threshold level;

A bidirectional register, the incrementation of which is controlled by the logical state A and the decrementation of which is controlled by the logical state D and in which the outputs of the flip-flops of each stage are decoded so as to produce the signals for controlling each switching element;

And a synchronization and control logic system comprising means for eliminating signals smaller in amplitude than a predetermined value $u$, said means being placed at the output of the variable-gain amplifier, a counter incremented by the signals derived from said means, a comparator for comparing the state of the counter with two series of pre-indicated numbers, the outputs of said comparator being connected to the storage circuit and to the decision logic circuit, and an adjustable delay device which is driven by a synchronizing signal and the output of which drives a counting permission system for the counter.

In any case, a better understanding of the present invention will be obtained from the following description of one embodiment of the invention which is given by way of example without any intended limitation, reference being made to the accompanying figures, wherein.

Figure 2:
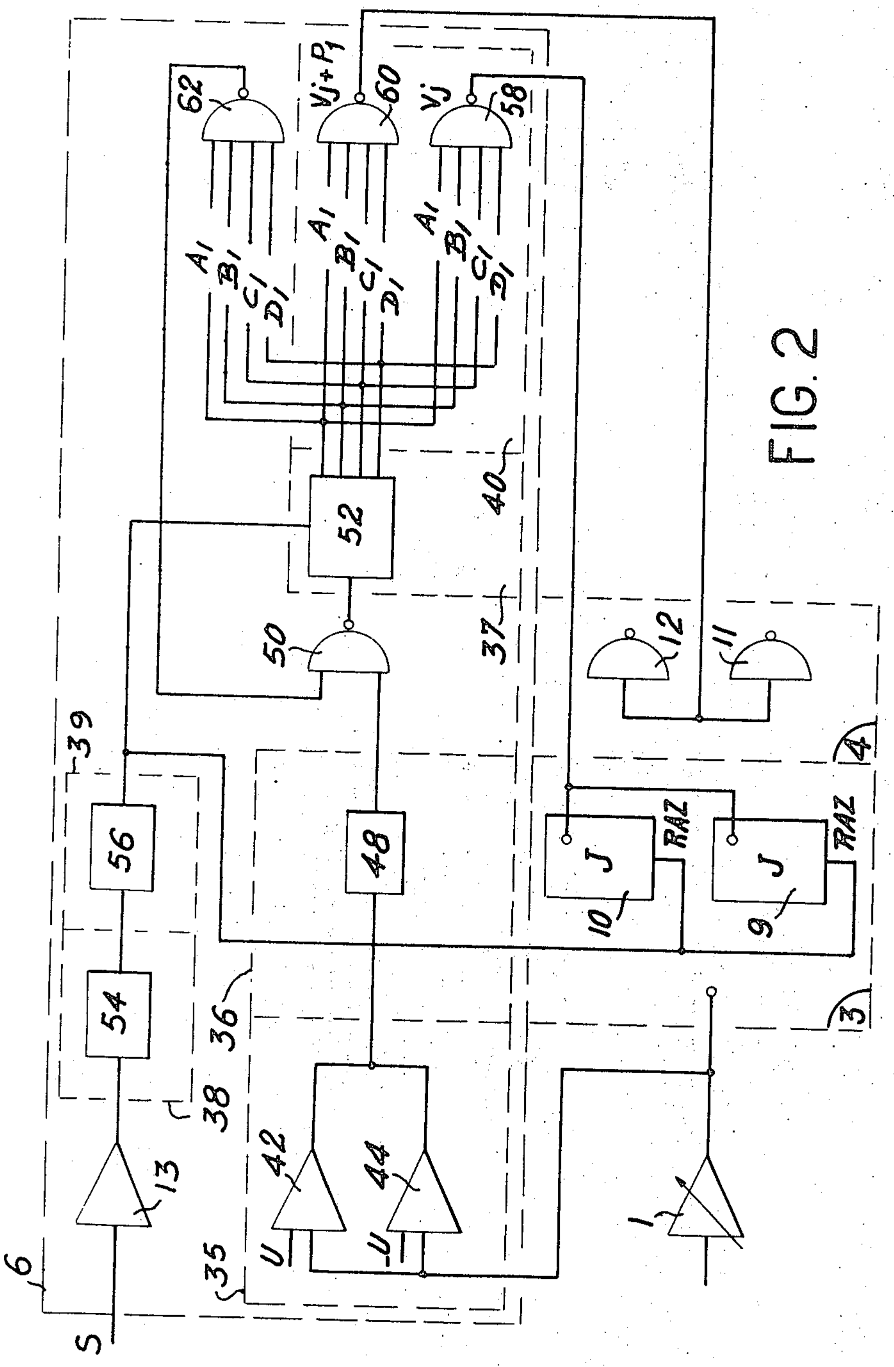
FIG. 2 is a detailed example of construction of the synchronization and control logic system.
Figure 2:
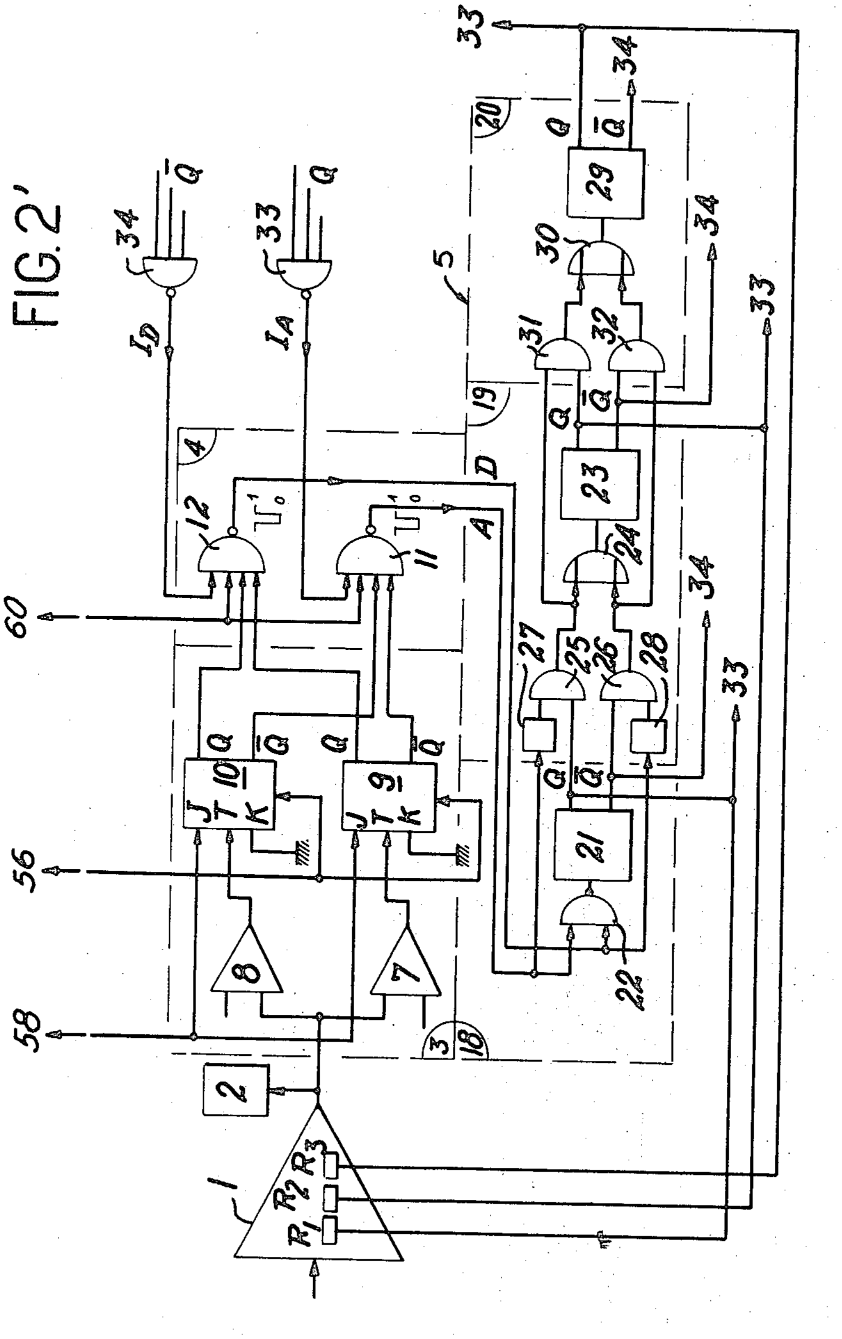
Figure 3:
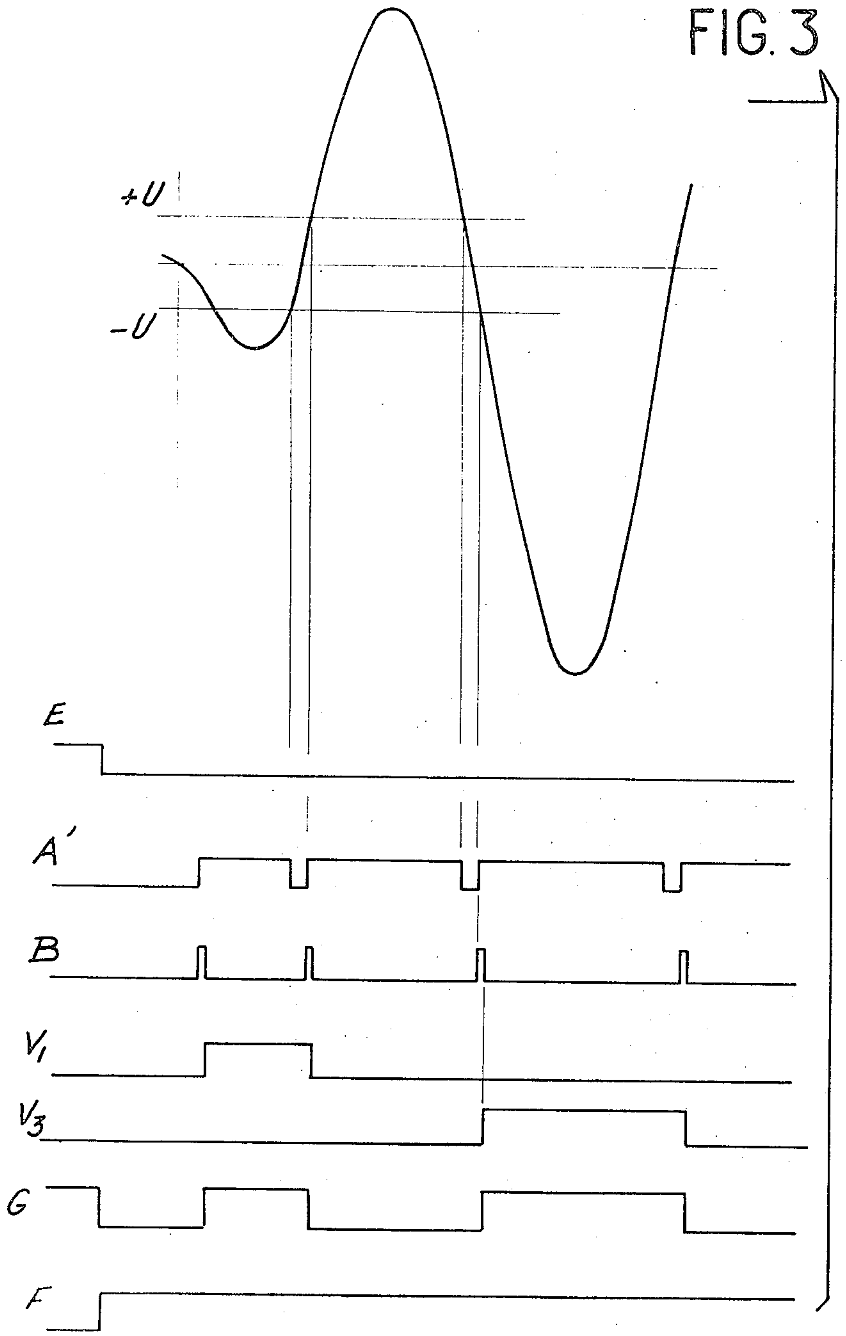

FIG. 2' is a detailed example of construction of the remainder of the device;

FIG. 3 is a diagram of the characteristic signals which appear at different points of the device.

Figure 1:
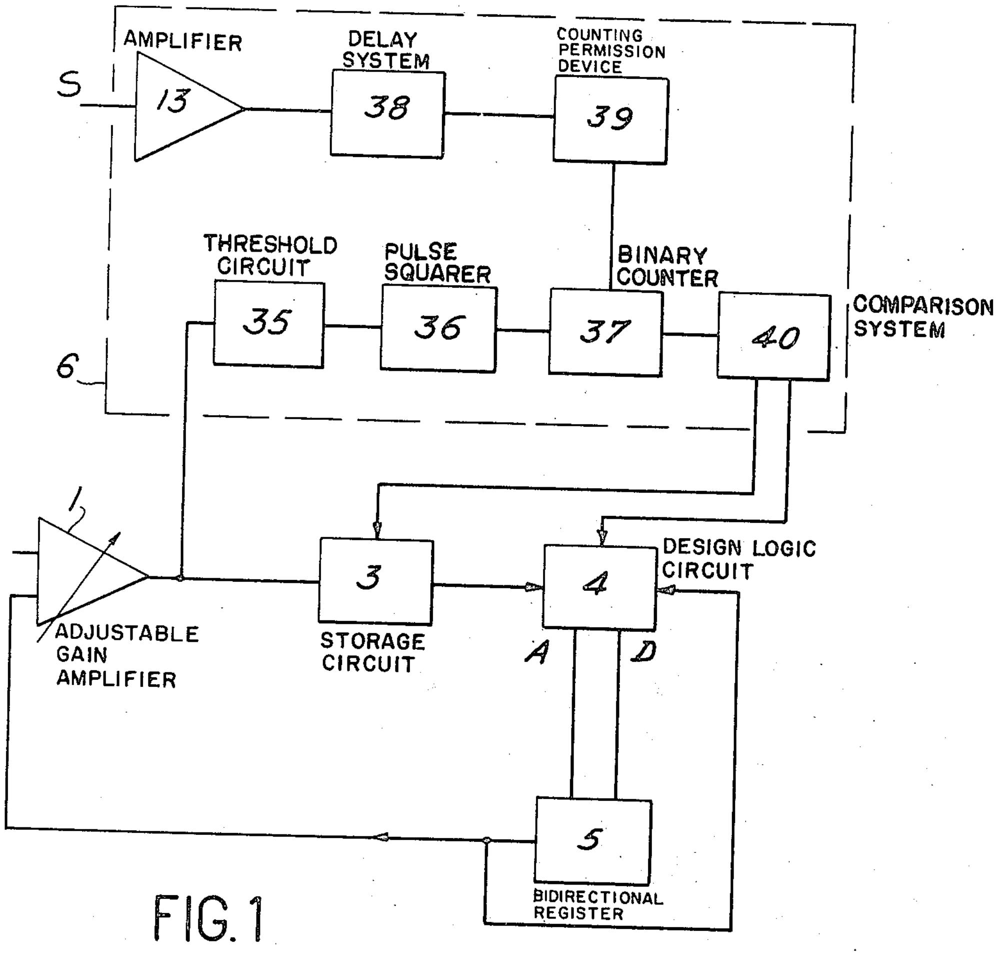
FIG. 1 is a block diagram of the device.

The simplified diagram given in FIG. 1 illustrates the complete device which essentially comprises the adjustable-gain amplifier 1, the input of which is driven by the signals to be matched. The amplifier 1 drives the storage circuit 3 which is in turn connected to the decision logic circuit 4. Said logic circuit generates the signals A and D which drive the inputs of the bidirectional register 5. The outputs of the bidirectional register 5 produce action on the one hand on the decision logic 4 and on the other hand on the adjustable-gain amplifier 1; the control and synchronization logic system 6 is essentially made up of a threshold circuit 35 which is driven by the signal delivered by the amplifier 1 and which delivers a signal at its output if the amplitude of the input signal is higher at absolute value than a value $u$. The output of said threshold system 35 drives a device 36 which delivers a square-topped voltage pulse $t_m$ when a pulse is applied to its input and when its output is at the logical level 0. The period of the signal is intended to mean the time which elapses between two transitions of said signal to zero. The device 36 drives the input of a binary counter 37. The synchronizing signal S which precedes each signal to be matched drives an amplifier 13, the output of which is introduced into a delay system 38. The output of the system 38 is fed into a counting permission device 39. Said device 39 is connected to the binary counter 37 and to the storage circuit 3. The output of the counter 37 is connected to a comparison system 40, one of the outputs of which is connected to the decision logic circuit and the other output of which is connected to the storage circuit 3.

The recurrent analog signals having amplitudes which are capable of varying from one to the other are applied to the amplifier 1 and transmitted by said amplifier to a recorder 2, for example; the gain of the amplifier is capable of varying in steps under the action of switching elements such as relays; in the exemplified embodiment herein described (FIG. 2′), provision is made for three relays $R_1$, $R_2$ and $R_3$ which permit eight possible values of gain; the table provided hereunder gives by way of example the eight possible values of the gain G according to the state of each relay (one excited relay is in state 1 and one non-excited relay is in state 0):

| $R_1$ | $R_2$ | $R_3$ | G |
|---|---|---|---|
| 0 | 0 | 0 | 8 |
| 1 | 0 | 0 | 16 |
| 0 | 1 | 0 | 32 |
| 1 | 1 | 0 | 64 |
| 0 | 0 | 1 | 128 |
| 1 | 0 | 1 | 256 |
| 0 | 1 | 1 | 512 |
| 1 | 1 | 1 | 1024 |

The three-stage birectional register 5 is of a known type. Its incrementation is controlled by the logical state A and its decrementation is controlled by the logical state D; one output of each stage of said register is connected to a gain-switching relay in order to provide it directly with its excitation signals; the decoding operation involved in this particular case is very simple since the number of relays is the same as the number of stages but it is apparent that, in any other case, it would be necessary to have recourse to a decoding cirucit in order that a predetermined configuration of the relays which undergo excitation should correspond to each state of the register.

In FIG. 2, there is shown a detailed form of construction of the synchronization and control logic system 6.

The threshold device 35 is constituted by a double threshold system 42 and 44 of known type which delivers a signal having the logical level 0 if the amplitude of the signal applied thereto is within the range of $+u$ and $-u$, and a signal having the logical level 1 in the contrary case. The voltage $u$ is given a value which is very close to zero.

The output of the double threshold system is applied to a monostable device 48 having a period $t_m$. Said monostable device is intended to prevent the counter from being incremented by spurious half-waves which could be created by the threshold system, the frequency of this spurious signal being of a high order. In fact, the first half-wave which appears at the input of the monostable device 48 initiates the changeover of this latter to the logical level 1 but the following half-waves which appear during the time interval $t_m$ have no effect on the monostable device 48. The counter is thus incremented only once.

The output of the monostable device 48 is applied to one of the inputs of a logical AND-gate 50. The output of said gate 50 drives the input of a binary counter 52. After having been amplified within the amplifier 13, the synchronizing signal S drives the monostable device 54 which has an adjustable period and the output of which in turn drives a monostable device having a period T which is longer than the total time-duration of each signal. The output of the monostable device 56 drives on the one hand the reset inputs of the flip-flops J, K 9 and 10 of the storage circuit 3 and on the other hand the counting permission input of the binary counter 52. In other words, the counter 52 can be incremented only during the time interval of the signal delivered by the monostable device 56. Moreover, the flip-flops 9 and 10 are reset by the trailing edge of the signal delivered by the monostable device 56. The outputs of the counter (which are four in number, namely $A_1$, $B_1$, $C_1$, $D_1$ in this example of construction) are connected to the comparison device 40. This device is constituted by a predetermined number of AND-gates having four inputs. The AND-gate 58 is connected to the outputs of the counter 52 through inverters so that, when the counter has attained the number $M_j$ corresponding to the order of the pulse to be selected, said gate 58 delivers a signal having a logical level 1; for example, in FIG. 3, we have $j = 3$ (signal $V_3$). The gate 58 is connected to the inputs $j$ of the flip-flops 9 and 10. The AND-gate 60 which is connected to the outputs of the counter 52 through inverters delivers the logical signal having the level 1 in respect of a pulse having a higher order, that is to say a pulse of the order $M_{j+p}$, and this pulse releases the gates 11 and 12 of the device 4.

Moreover, the outputs of the counter 52 are connected directly to the four inputs of the AND-gate 62, the output of which is applied to the second input of the AND-gate 50. Thus, when all the outputs of the counter are at the level 1 (that is to say when the counter has attained its maximum counting capacity), the signal delivered by the gate 62 closes the gate 50. The counter 52 is thus prevented from assuming the binary state 1 at the following pulse.

Should it be desired to match the amplitude with a number of half-waves of the signal instead of a single half-wave, the comparator is completed by gates which are identical with the gates 60 and 58 but connected in such a manner as to deliver the logical signal 1 in respect of the pulses respectively of the order $k$ and $k + p'$ if it is desired to match the amplitude of the pulse having the order K.

There can be added to the device 6′ output gates which serve to control the time-duration of the signal E, the time-duration of the first half-wave which is recorded by counting (signal $V_1$) and the time-duration of the signal which is preselected by adjusting the amplitude $V_j$.

This result is obtained at the output of an OR-gate, the inputs of which are driven by the output of the monostable device 54 and of AND-gates such as the gate 60 which correspond respectively to the binary state 1 and to the binary state $j$. In FIG. 3, curve G corresponds to the case in which $j$ has the value of 3. This signal G makes it possible to check on the screen of an oscilloscope whether the amplitude of the signal has been correctly adjusted on the basis of the amplitude of the selected half-wave.

The remainder of the device is shown in FIG. 2'.

The storage circuit 3 is essentially constituted by two comparators 7 and 8 and two flip-flops of type JK 9 and 10 in which the inputs K are connected to ground, the inputs J are connected to the output of the AND-gate 58 and the inputs T are connected to the outputs of the comparators 7 and 8 respectively. The comparators 7 and 8 are connected in parallel to the output of the amplifier 1 and adjusted so as to be released respectively at a level which is slightly lower than the level of saturation of the recorder 2 and at a level which is compatible with the minimum acceptable resolution. These two levels constitute respectively the upper and lower threshold levels mentioned earlier. By way of example, if the level of saturation of the recorder is 10 volts, the levels chosen are 9 and 3 volts. The comparators deliver a logical signal 1 to the next following flip-flops when the amplitude of the output signal of the amplifier exceeds the lower threshold level in the case of the comparator 8 and the upper threshold level in the case of the comparator 7.

The decision logic circuit 4 is constituted by two AND-gates 11 and 12 at the outputs of which are collected the logical orders A and D respectively which correspond to the appearance of the level 0. One of the inputs of the gate 11 is connected to the output $\overline{Q}$ of the flip-flop 9 and another input is connected to the output $\overline{Q}$ of the flip-flop 10. On a third input, said gate 11 receives from the AND-gate 60 of the control logic system 6 the order to transmit the logical state A to the register 5 and, on a fourth input, said gate 11 receives a state $I_A$ which prevents said transmission under conditions explained hereinafter. One of the inputs of the gate 12 is connected to the output Q of the flip-flop 9 and another input of said gate is connected to the output Q of the flip-flop 10. On a third input, said gate 12 receives from the AND-gate of the control logic system 6 the order to transmit the logical state D to the register 5 and, on a fourth input, said gate 12 receives a state $I_D$ such as to prevent this transmission under conditions which will also be explained in detail in the description given hereinafter.

The three stages of the bidirectional register 5 are shown at 18, 19 and 20. The first stage 18 is constituted by a flip-flop 21 and an AND-gate 22, the output of which is connected to the input of said flip-flop; its inputs are connected in one case to the output of the AND-gate 11 and in the other case to the output of the AND-gate 12. The second stage 19 is constituted by a flip-flop 23, an OR-gate 24 and two AND-gates 25 and 26. One of the inputs of the gate 25 is connected to the output Q of the flip-flop 21 and the other input is connected through an inverter circuit 27 to the output of the AND-gate 11. One of the inputs of the AND-gate 26 is connected to the output $\overline{Q}$ of the flip-flop 21 and the other input is connected through an inverter circuit 28 to the output of the AND-gate 12. The two inputs of the OR-gate 24 are connected in one case to the output of the AND-gate 25 and in the other case to the output of the AND-gate 26; its output is connected to the input of the flip-flop 23. The third stage 20 is constituted by a flip-flop 29, an OR-gate 30 and two AND-gates 31 and 32. The inputs of the gate 31 are connected in one case to the output of the AND-gate 25 and in the other case to the output Q of the flip-flop 23. The inputs of the AND-gate 32 are connected in one case to the output $\overline{Q}$ of the flip-flop 23 and in the other case to the output of the AND-gate 26. The inputs of the OR-gate 30 are connected in one case to the output of the AND-gate 31 and in the other case to the output of the AND-gate 32; its output is connected to the input of the flip-flop 29. The outputs Q of the three flip-flops 21, 23 and 29 are connected respectively to the relays $R_1$, $R_2$ and $R_3$, said relays being energized by means of a logical signal 1. The state of the register 5 which corresponds to the maximum and minimum gains must be decoded in order to determine the states $I_A$ and $I_D$. To this end, the outputs Q of the flip-flops of the register 6 are connected to the inputs of an AND-gate 33 which supplies to the AND-gate 11 the state $I_A$ for preventing transmission of the decision A. The outputs $\overline{Q}$ of said three flip-flops are connected to the inputs of a AND-gate 34 which supplies to the AND-gate 12 the state $I_D$ which prevents transmission of the decision D.

The schematic diagram 1 and the curves of FIG. 3 clearly illustrate the operation of the sychronization and control logic system 6. The synchronizing pulse triggers the adjustable-delay device 38 which delivers the signal E, with the result that said device is permitted to trip (level 0) with the first pulse of the transverse signal, for example. The device 38 triggers the counting permission device 39, the period T of which is adjusted so as to be considerably longer than the total time-duration of the signal. While the signal F delivered by the permission system 39 is at the level 1, the counter 37 can be incremented. The threshold device 35 delivers a signal A' having the logical level 1 when the signal applied to its input has an amplitude which is greater at absolute value than $u$. The leading edges of the signal delivered by the system 35 trigger the single-pulse device 36 which has a period $t_m$. Thus, by means of the device 36, if a number of pulses appear during the time interval $t_m$, there will only be one pulse having a time-width or duration $t_m$ at its output. The signal B delivered by the device 36 increments the counter 37 as long as the output of the counting permission device 39 is at the level 1. When the state of the counter attains the value which is preset at the comparator 40 ($M_j$), the signal delivered by the comparator 40 is applied to the permission inputs of the flip-flops "JK" 9 and 10 of the storage circuit 3. At the following pulse ($M_{j+p}$), it emits the signal C which delivers the signal for opening the gates 11 and 12 of the circuit 4, the quantity $j + p$ being smaller than the capacity of the counter.

At the end of the period of the counting permission device 39, the flip-flops "JK" 9 and 10 are reset to zero. The complete device is therefore ready to receive a further signal.

After the signal delivered by the comparator 40 has been applied to the inputs J of the flip-flops 9 and 10 and when the signal to be recorded appears at the input of the comparators 7 and 8, three cases can arise:

1. The amplitude exceeds the upper threshold level; in this case, the outputs of the two comparators 7 and 8 deliver logical signals 1: the flip-flops 9 and 10 change over to state 1 and remain in this state.
2. The amplitude does not attain the lower threshold level; in this case, the outputs of the comparators do not deliver any signal and the flip-flops remain in state 0.
3. The amplitude exceeds the lower threshold level but does not attain the upper threshold level; in this case, only the output of the comparator 8 supplies logical signals 1 and the flip-flop 10 changes over to state 1 and remains in this state.

The appearance of the signal C initiates the application of a logical signal 1 to the AND-gates 11 and 12. Postulating that the AND-gates 33 and 34 then also deliver at the output a logical signal 1 corresponding to the absence of prohibition, the following three cases are possible:

1. The outputs Q of the flip-flops 9 and 10 are in state 1; the AND-gate 12 releases the state D which causes a one-step decrementation of the register 5 and the state of this latter is accordingly transmitted to the relays $R_1$, $R_2$ and $R_3$ of the amplifier 1, the gain of which decreases by one step. If, for example, the flip-flops 21, 23 and 29 of the register are respectively in states 1 1 0 which correspond to an excitation of the relays $R_1$ and $R_2$, that is to say to the gain 64, said flip-flops assume the states 0 1 0 which correspond to an excitation of the relay $R_2$ alone, that is to say to the gain 32.
2. The outputs Q of the flip-flops 9 and 10 remain in state 0: the AND-gate 11 releases the state A which causes a one-step incrementation of the register 5 and the state of this latter is accordingly transmitted to the relays $R_1$, $R_2$ and $R_3$ of the amplifier, the gain of which increases by one step. If, for example, the flip-flops 21, 23 and 29 are respectively in the states 1 0 1 which correspond to an excitation of the relays $R_1$ and $R_3$, that is to say to the gain 256, said flip-flops assume the states 0 1 1 which correspond to an excitation of the relays $R_2$ and $R_3$, that is to say to the gain 512.
3. The output Q of the flip-flop 10 is in state 1 whilst the output of the flip-flop 9 remains in state 0; the gates 11 and 12 do not supply any order and no variation in gain occurs.

Thus, when the amplitude of the output signal of the amplifier 1 exceeds the upper threshold level, a reduction in gain accordingly takes place. When the amplitude does not attain the lower threshold level, an increase in gain occurs. Finally, when the amplitude exceeds the lower level but does not attain the upper level, the gain is not modified.

The AND-gate delivers the prohibition state $I_A$ corresponding to the appearance of the level 0 at its output when the three outputs Q of the flip-flops 21, 23 and 29 are in state 1, that is to say when the register 5 is in the state which defines the maximum gain. The state of prohibition $I_A$ prevents the delivery of the order A via the AND-gate 11 which would otherwise cause the register 5 to change directly to a state defining the minimum gain; this is liable to occur when a signal whose amplitude does not attain the lower threshold level appears whilst the gain of the amplifier has its highest value.

The AND-gate 34 delivers the prohibition state $I_D$ which corresponds to the appearance of the level 0 at its output when the three outputs $\overline{Q}$ of the flip-flops 21, 23 and 29 are in state 1, that is to say when the register 5 is in the state which defines the minimum gain. The state of prohibition $I_D$ prevents delivery of the order D via the AND-gate 12 which would otherwise cause the register to change to a state defining the maximum gain; this would be liable to occur when a signal whose amplitude exceeds the upper threshold level appears whilst the gain of the amplifier has its lowest value.

What we claim is:

1. A device for the automatic adjustment of the amplitude of recurrent analog signals with respect to a lower threshold level and an upper threshold level, wherein said device comprises:

an amplifier to which said signals are applied and the gain of which is capable of varying in steps under the action of switching elements;

a storage circuit for indicating the amplitude of each output signal of said amplifier with respect to said levels;

a decision logic circuit having the design function of producing as a function of the idications collected by said storage circuit a logical state A if the indicated amplitude does not attain said lower threshold level or a logical state D if the indicated amplitude exceeds said upper threshold level;

a bidirectional register, the incrementation of which is controlled by said logical state A and the decrementation of which is controlled by said logical state D said register including means to produce signals for controlling said switching elements in accordance with the count in said bidirectional register;

and a synchronization and control logic system comprising means for eliminating signals smaller in amplitude than a predetermined value $U$, said means being placed at the output of said variable-gain amplifier, a counter incremented by the signals derived from said last named means, a comparator for comparing the state of said counter with two series of pre-indicated numbers, the outputs of said comparator being connected to said storage circuit and to said decision logic circuit, and an adjustable delay device which is driven by a synchronizing signal and the output of which drives a counting permission system for said counter.

2. A device according to claim 1, wherein the storage circuit is constituted by two comparators connected in parallel at the output of said amplifier and adjusted so as to be triggered in one case at said lower threshold level and in the other case at said upper threshold level, and by two flip-flops each connected to the output of one of said comparators.

3. A device according to claim 2, wherein the decision logic circuit is constituted by a first AND-gate having two inputs each connected to the output Q of a flip-flop of the storage circuit and by a second AND-gate having two inputs each connected to the output Q of a flip-flop of the storage circuit, said gates being intended to deliver respectively said logical states A and D.

4. A device according to claim 3, wherein:

those outputs of said comparator which correspond to the first series drive inputs for permission of changeover to state 1 of said flip-flops of said storage circuit whilst the outputs corresponding to the second series drive the inputs of said AND-gates of said decision logic circuit;

and the output of said adjustable-delay device drives the reset inputs of said flip-flops of said storage circuit.

5. A device according to claim 4, wherein said means for eliminating the signals which are smaller in amplitude than the value U are constituted by a double-threshold device having the respective thresholds + U and − U.

6. A device according to claim 4, wherein said comparator is constituted by an even number of AND-gates comprising a number of inputs corresponding to the number of outputs of said counter, each input of said last mentioned gates being connected to one output of said counter, a predetermined number of inputs of said last mentioned gates being provided with an inverter so that the output of each gate aforesaid should correspond to a predetermined order of said counter.

7. A device according to claim 4, wherein a rectangular signal having a time-width *t* and derived from the adjustable-delay device drives the input of said counter through a third AND-gate whose other input is connected to the output of a fourth AND-gate, the inputs of said fourth gate being connected to the outputs of said counter.

8. A device according to claim 4, wherein said device has an output constituted by an OR-gate whose inputs are driven by the output of the adjustable-delay device and by the AND-gate outputs which are driven by the outputs of said counter, a predetermined number of inputs of said last mentioned AND-gates being provided with inverters in order that each AND-gate aforesaid should correspond to a predetermined order ot said counter.

* * * * *